United States Patent
Kinch et al.

(10) Patent No.: US 9,062,782 B2
(45) Date of Patent: Jun. 23, 2015

(54) HYDRAULIC GAIN OF TRANSMISSION CONTROL ELEMENTS

(71) Applicant: FORD GLOBAL TECHNOLOGIES, LLC, Dearborn, MI (US)

(72) Inventors: Derek Kinch, Ypsilanti, MI (US); Kurt H. Nickerson, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 288 days.

(21) Appl. No.: 13/733,259

(22) Filed: Jan. 3, 2013

(65) Prior Publication Data

US 2014/0182693 A1 Jul. 3, 2014

(51) Int. Cl.
| | |
|---|---|
| F16D 25/10 | (2006.01) |
| F16K 11/07 | (2006.01) |
| F16K 17/00 | (2006.01) |
| F16H 61/02 | (2006.01) |

(52) U.S. Cl.
CPC ........... *F16K 17/00* (2013.01); *Y10T 137/0379* (2015.04); *Y10T 137/7781* (2015.04); *F16H 61/0206* (2013.01); *F16H 61/0276* (2013.01); *F16H 2061/0288* (2013.01)

(58) Field of Classification Search
CPC ............................ F16H 1/0206; F16H 61/0276
USPC .................. 192/85.63; 475/127; 137/625.25, 137/625.65, 625.69
See application file for complete search history.

(56) References Cited

U.S. PATENT DOCUMENTS

| | | | | | |
|---|---|---|---|---|---|
| 4,347,765 | A | * | 9/1982 | Leonard et al. | 477/150 |
| 6,155,949 | A | * | 12/2000 | Long et al. | 475/127 |
| 6,913,554 | B2 | * | 7/2005 | Younger | 475/127 |
| 7,559,866 | B2 | * | 7/2009 | Kondoh et al. | 475/127 |
| 2012/0138415 | A1 | * | 6/2012 | Yagi | 192/85.63 |

FOREIGN PATENT DOCUMENTS

WO    WO 2011021421 A1 *  2/2011

* cited by examiner

*Primary Examiner* — Marina Tietjen
*Assistant Examiner* — Seth W Mackay-Smith
(74) *Attorney, Agent, or Firm* — James Dottavio; MacMillan, Sobanski & Todd, LLC

(57) ABSTRACT

A system controlling gain in a control element includes a source of line pressure, a source of signal pressure, a control valve that controls communication between line pressure and the control element, including a first differential area communicating with control element pressure, and a second differential area, and a gain control valve that opens and closes communication between control element pressure and the second differential area in response to signal pressure.

8 Claims, 1 Drawing Sheet

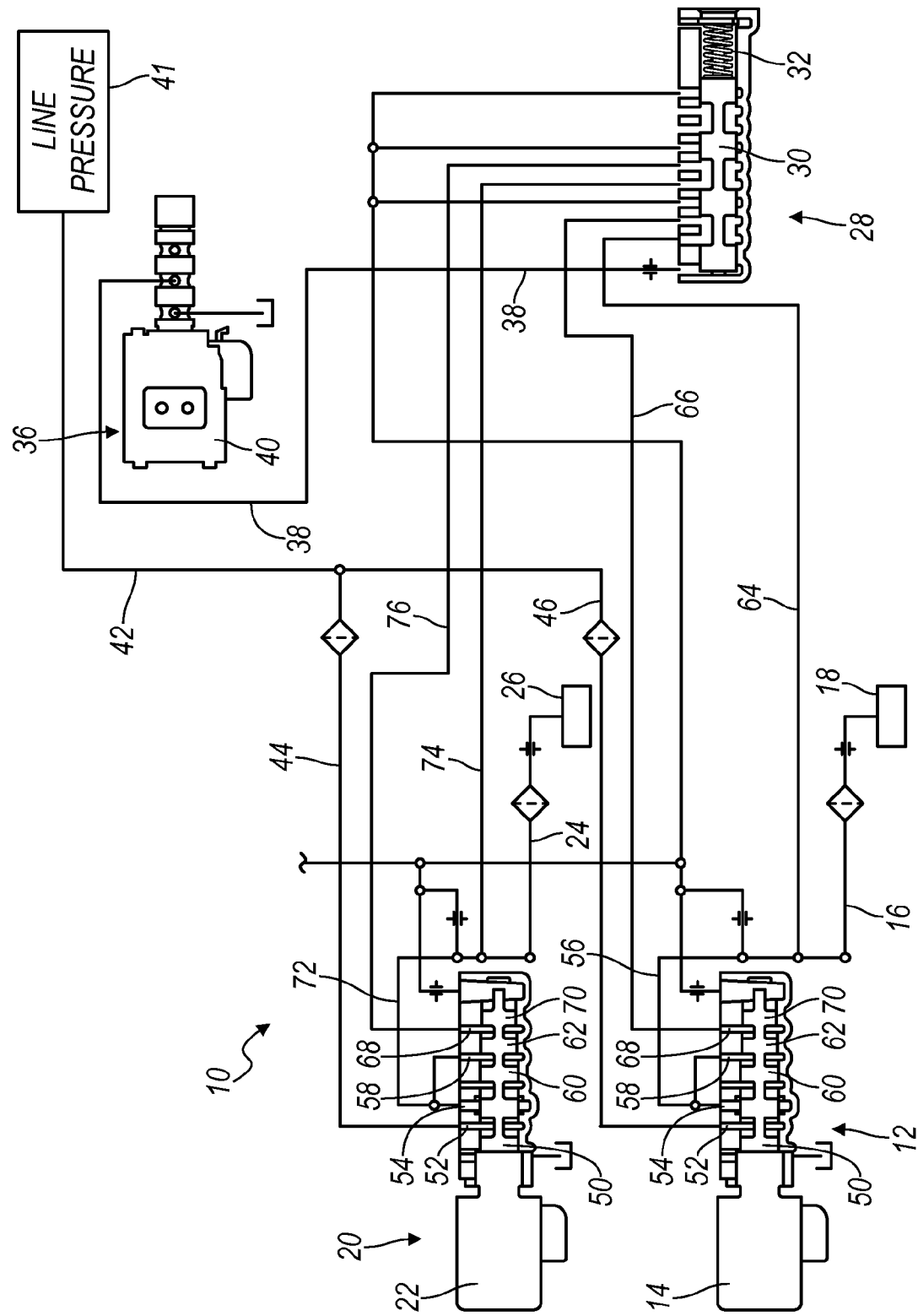

HYDRAULIC GAIN OF TRANSMISSION CONTROL ELEMENTS

BACKGROUND OF THE INVENTION

1. Field of the Invention

This invention relates generally to controlling gain of the hydraulic pressure applied to the servos that engage and release transmission clutches and brakes.

2. Description of the Prior Art

Automatic transmissions that employ planetary gearing often use the same shift control element, i.e., friction brake or friction clutch, to produce gearshifts among multiple transmission gear ratios. Necessarily, the gain of the hydraulic pressure used to produce the torque capacity of each clutch or brake will be different depending on which gear is applied.

In order to achieve smooth gear shifting, hydraulic gain management is used to provide optimum torque capacity of the respective shift control element. For example, in six-speed transmissions, gain management for a given clutch is often achieved using the control pressure from a different clutch.

In automatic transmissions able to produce a greater number of forward gear ratios, this is difficult to achieve because each clutch is applied in a greater number of gears. A single clutch control pressure cannot provide enough logical information to allow for gain management in transmission having a large number of forward gears.

In conventional practice, solenoid and spool valves are controlled by a system wherein the output of the command solenoid is routed to the designated spool valve being controlled, as well as to a shift valve. The shift valve is used to selectively route solenoid pressure to an additional area on the spool valve, thereby increasing the area on which solenoid pressure acts, resulting in a change in valve gain, i.e., the output/signal pressure ratio. The shift valve in these systems is controlled by a solenoid dedicated to this purpose. Additional dual gain regulators would then require additional shift valves and shift valve control solenoids.

SUMMARY OF THE INVENTION

A system controlling gain in a control element includes a source of line pressure, a source of signal pressure, a control valve that controls communication between line pressure and the control element, including a first differential area communicating with control element pressure, and a second differential area, and a gain control valve that opens and closes communication between control element pressure and the second differential area in response to signal pressure.

The system uses line pressure control solenoid output pressure as the control signal for clutch gain management. This allows for clutch gain to be managed for each clutch and brake element independently in each gear state.

The system provides gain management such that clutch gain is independently selected in each gear state via the line pressure control solenoid without additional hydraulic control elements needed to manage gain selection with multiple clutch elements. A single gain control valve is used for multiple dual gain regulators, without the addition of added gain controlling hardware, such as solenoids.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

FIG. 1 is a schematic diagram of a system for managing hydraulic gain.

The invention will be more readily understood by reference to the following description, taken with the accompanying drawing, in which the FIGURE is a schematic diagram showing a hydraulic gain selection system.

DESCRIPTION OF THE PREFERRED EMBODIMENT

The hydraulic gain selection system 10 includes a clutch control valve 12, which is actuated by a solenoid 14 to produce a clutch-apply pressure carried in hydraulic line 16 to a clutch 18 of an automatic transmission. Similarly clutch control valve 20 is actuated by a solenoid 22 to produce clutch-apply pressure carried in hydraulic line 24 to another clutch 26 of the transmission.

A gain control valve 28 includes a spool 30, which is urged by a compression spring 32 to move to the left-hand side of a valve bore, in which the spool and spring are located.

A fluid pressure signal output from a line pressure control valve 36 is carried in hydraulic line 38 to gain control valve 28. Line pressure control valve 36 is actuated by a solenoid 40. Signal pressure acting on the spool 30 of valve 28 produces a force on the spool that acts rightward in opposition to the force of spring 32.

Fluid at regulated line pressure is carried from a line pressure source 41 in hydraulic lines 42, 44 to clutch control valve 20 and in lines 42, 46 to clutch control valve 12.

Clutch control valve 12 includes a spool 50 formed with lands having unequal cross-sectional areas on which pressure is applied.

In operation, the system 10 produces low gain and a clutch-apply pressure in clutch 18 to an upper limit of about 100 psi. by applying to solenoid 14 electric current, preferably in the range between 0-1 amps. While low gain is produced, line pressure is at a relative low magnitude, such that the spool 30 of gain control valve 28 is located at the left-hand end of the valve due to the force of spring 32.

Solenoid 14 opens a connection between ports 52, 54, thereby directing fluid at clutch-apply pressure to clutch 18 through lines 56 and 16 and to port 58 of valve 12. Clutch-apply pressure at port 58 acts on the larger area of land 60 and smaller area of land 62, thereby producing a first differential pressure force on spool 50 tending to oppose the force of solenoid 14.

Clutch-apply pressure is carried in lines 56 and 64, through gain control valve 28 and in line 66 to port 68 of valve 12. Clutch-apply pressure acts on the larger area of land 62 and the smaller area of land 70, thereby producing a second differential pressure force on spool 50 tending to oppose the force of solenoid 14 and to maintain gain at the lower magnitude.

The system 10 produces high gain and a clutch-apply pressure in clutch 18 of about 200 psi. while solenoid 14 is energized with electric current. While high gain is produced, line pressure is at a relative higher magnitude causes the spool 30 of gain control valve 28 to move rightward against the force of spring 32, thereby closing communication between lines 64 and 66, removing the second differential pressure force from spool 50 of valve 12, opening the throttled communication between ports 52 and 54 of valve 12, thereby increasing the magnitude of clutch-apply pressure supplied to clutch 18.

In a similar way operation, the system 10 produces low gain and a clutch-apply pressure in clutch 26 to an upper limit of about 100 psi. by applying to solenoid 22 electric current, preferably in the range between 0-1 amps. While low gain is produced, line pressure is at a relative low magnitude, such that the spool 30 of gain control valve 28 is located at the left-hand end of the valve due to the force of spring 32.

Solenoid 22 opens a connection between ports 52, 54, thereby directing fluid at clutch-apply pressure to clutch 26 through lines 72 and 16 and to port 58 of valve 20. Clutch-apply pressure at port 58 acts on the larger area of land 60 and smaller area of land 62, thereby producing a first differential pressure force on spool 50 tending to oppose the force of solenoid 22.

Clutch-apply pressure is carried in lines 72 and 74, through gain control valve 28 and in line 76 to port 68 of valve 20. Clutch-apply pressure acts on the larger area of land 62 and the smaller area of land 70, thereby producing a second differential pressure force on spool 50 of valve 20 tending to oppose the force of solenoid 22 and to maintain gain at the lower magnitude.

The system 10 produces high gain and a clutch-apply pressure in clutch 26 of about 200 psi. while solenoid 22 is energized with current. While high gain is produced, line pressure is at a relative higher magnitude causes the spool 30 of gain control valve 28 to move rightward against the force of spring 32, thereby closing communication between lines 74 and 76, removing the second differential pressure force from spool 50 of valve 20, opening the throttled communication between ports 52 and 54 of valve 20, thereby increasing the magnitude of clutch-apply pressure supplied to clutch 26.

Although the system and control method have been described with reference to hydraulic gain control of transmission clutches, the system and control can be applied also to hydraulic gain control of transmission of brakes and to gain control of components other than those of transmissions.

Fundamental to gain selection on clutch control valve is that higher gain provides the ability to attain higher pressures in the servos of clutches and brakes. In order to achieve these higher pressures, higher system line pressures are generally required. The system takes advantage of this inherent overlap between line pressure and high gain conditions to use the line pressure command solenoid as the signal device for the gain control valve.

In accordance with the provisions of the patent statutes, the preferred embodiment has been described. However, it should be noted that the alternate embodiments can be practiced otherwise than as specifically illustrated and described.

The invention claimed is:

1. A system for controlling hydraulic gain, comprising:
   first and second control elements;
   a source of line pressure;
   a source of signal pressure;
   a first control valve that controls communication between line pressure and the first control element, including a first differential area communicating with pressure supplied to the first control element, and a second differential area;
   a second control valve that controls communication between line pressure and the second control element, including a third differential area communicating with pressure supplied to the second control element, and a fourth differential area;
   a gain control valve responsive to signal pressure for opening and closing communication between pressure supplied to the first control element and the second differential area, and for opening and closing communication between pressure supplied to the second control element and the fourth differential area.

2. The system of claim 1, wherein:
   the first control valve further comprises a solenoid for controlling communication between the line pressure source and the first control element;
   the second control valve further comprises a second solenoid for controlling communication between the line pressure source and the second control element.

3. The system of claim 1, wherein:
   the first control valve includes a spool displaceable in a bore by a solenoid, and formed with first, second and third lands, the first and second lands defining the first differential area, the second and third lands defining the second differential area.

4. The system of claim 1, wherein:
   the second control valve includes a second spool displaceable in a second bore by a second solenoid, and formed with a fourth land, a fifth land and a sixth land, the fourth and fifth lands defining the third differential area, the fifth and sixth lands defining the fourth differential area.

5. The system of claim 1, wherein the gain control valve includes:
   a third spool displaceable in a third bore in response to signal pressure, the third spool opening and closing communication between pressure supplied to the first control element and the second differential area, and for opening and closing communication between pressure supplied to the second control element and the fourth differential area.

6. The system of claim 1, wherein the first control valve includes:
   a bore containing a spool displaceable in the bore;
   a first port supplied with line pressure;
   a second port through which the first port communicates through the bore with the first control element and the gain control valve;
   a third port communicating with the second port;
   a fourth port communicating with the gain control valve;
   the spool displaceable in a bore, the spool including:
      a first land having a first area, a second land having a second area smaller than the first area, pressure in the third port being applied to the first and second areas tending to close communication between the first and second ports;
      a third land having a third area smaller than the second area, pressure in the fourth port being applied to the second and third areas tending to close communication between the first and second ports.

7. The system of claim 1, wherein the first control valve includes:
   a bore containing a spool displaceable in the bore;
   a first port supplied with line pressure;
   a second port through which the first port communicates through the bore with the second control element and the gain control valve;
   a third port communicating with the second port;
   a fourth port communicating with the gain control valve;
   a spool displaceable in a bore, the spool including:
      a first land having a first area, a second land having a second area smaller than the first area, pressure in the third port being applied to the first and second areas tending to close communication between the first and second ports;

a third land having a third area smaller than the second area, pressure in the fourth port being applied to the second and third areas tending to close communication between the first and second ports.

8. The system of claim 1, wherein the gain control valve includes:

a spool displaceable in a bore in response to signal pressure, the spool opening and closing communication between pressure supplied to a first control element and the second differential area, the spool opening and closing communication between pressure supplied to a second control element and the fourth differential area.

* * * * *